(12) United States Patent
Sato

(10) Patent No.: US 6,724,547 B2
(45) Date of Patent: Apr. 20, 2004

(54) SINGLE-FOCUS LENS

(75) Inventor: Kenichi Sato, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 0 days.

(21) Appl. No.: 10/280,053

(22) Filed: Oct. 25, 2002

(65) Prior Publication Data
US 2003/0095341 A1 May 22, 2003

(30) Foreign Application Priority Data

Nov. 16, 2001 (JP) ........................... 2001-350913

(51) Int. Cl.⁷ ............... G02B 9/14; G02B 13/18
(52) U.S. Cl. ....................... 359/785; 359/716
(58) Field of Search ................. 359/785, 716, 359/738–740

(56) References Cited

U.S. PATENT DOCUMENTS 6,490,102 B1 * 12/2002 Huang .................... 359/785

FOREIGN PATENT DOCUMENTS

JP 05-157962 6/1993
JP 11-125767 5/1999

* cited by examiner

*Primary Examiner*—Ricky Mack
*Assistant Examiner*—Alicia M. Harrington
(74) *Attorney, Agent, or Firm*—Snider & Associates; Ronald R. Snider

(57) ABSTRACT

A single-focus lens includes from the object side, a first lens with a positive refracting power having at least one aspheric surface, a stop, a second lens with a negative refracting power, and a third lens with a positive refracting power having at least one aspheric surface. This single-focus lens further satisfies the conditional expression of $0.3<f/f2'3<0.8$, where f is the focal length of the lens as a whole, and f23 is the composite focal length of the second and third lenses.

5 Claims, 4 Drawing Sheets

EXAMPLE 1

EXAMPLE 2

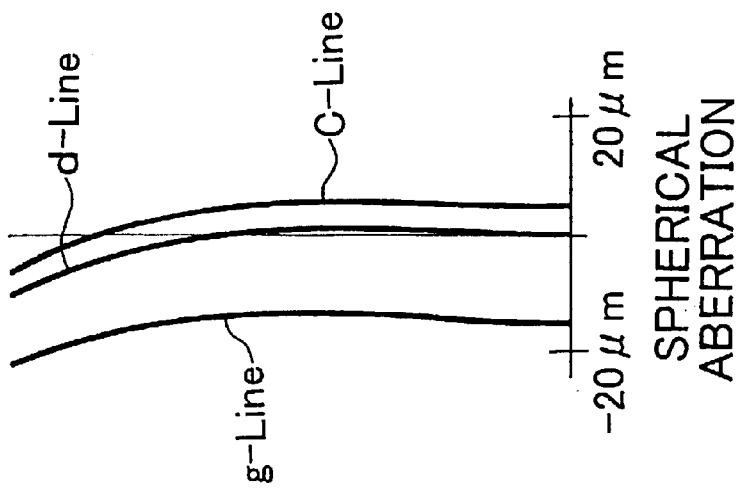
FIG.3A EXAMPLE 1 F/5.60 — SPHERICAL ABERRATION (d-Line, C-Line, g-Line)
FIG.3B EXAMPLE 1 ω=24.7° — ASTIGMATISM (SAGITTAL, TANGENTIAL)
FIG.3C EXAMPLE 1 ω=24.7° — DISTORTION

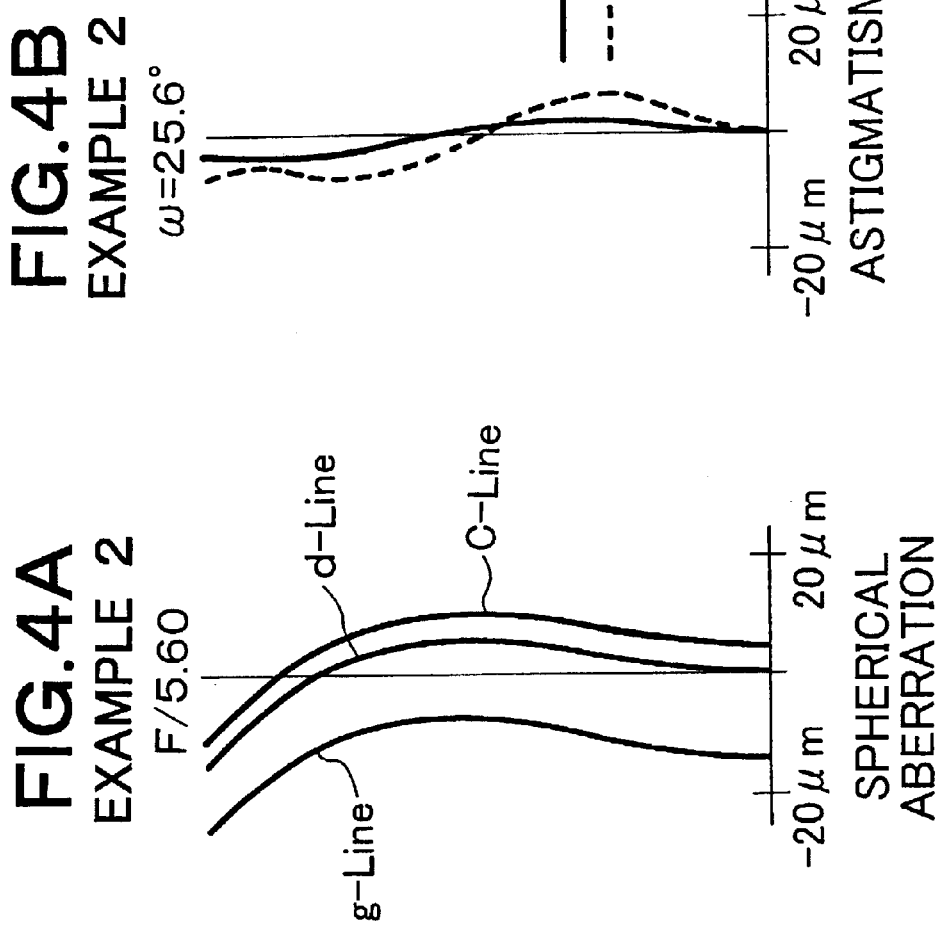

SINGLE-FOCUS LENS

RELATED APPLICATIONS

This application claims the priority of Japanese Patent Application No. 2001-350913 filed on Nov. 16, 2001, which is incorporated herein by reference.

BACKGROUND OF THE INVENTION

1. Field of the Invention

The present invention relates to a single-focus lens suitable as a taking lens for an imaging device having a small size; and, in particular, to a single-focus lens with a simple configuration having a high optical performance.

2. Description of the Prior Art

Recently, along with the advance in CCD manufacturing techniques, small-sized CCD cameras such as electronic still cameras have begun utilizing a high-density CCD whose number of pixels reaches the order of one million while each pixel reduces its size. Consequently, taking lenses for CCD cameras are desired to have a high resolution and high performances.

Known as taking lenses responding to such a demand are those disclosed in Japanese Unexamined Patent Publication No. HEI 5-157962 and No. HEI 11-125767, for example. The former is a front shutter type taking lens of four-group, five-lens configuration in which a stop is disposed on the object side of the first lens group; whereas the latter is a taking lens of two-group, six-element configuration in which a stop is disposed between the first and second lens groups.

While the taking lenses for CCD cameras are desired to have high optical performances, there are strong demands for making them smaller and less expensive. Demanded are taking lenses having high optical performances on a par with those of conventional ones while further reducing the number of lenses so as to achieve a smaller size and a lower cost.

SUMMARY OF THE INVENTION

In view of the circumstances mentioned above, it is an object of the present invention to provide a single-focus lens having a simple three-lens configuration which can achieve a smaller size while favorably correcting aberration, as a taking lens for a small-sized imaging device for a digital camera or the like.

The present invention provides a single-focus lens comprising, successively from the object side, a first lens with a positive refracting power having at least one aspheric surface, a stop, a second lens with a negative refracting power, and a third lens with a positive refracting power having at least one aspheric surface; and satisfying the following conditional expression (1):

$$0.3 < f'/f'_{23} < 0.8 \quad (1)$$

where f' is the focal length of the lens as a whole; and $f'_{23}$ is the composite focal length of the second and third lenses.

Preferably, the first lens has a meniscus form with a concave surface on the object side, the second lens has a concave surface on the object side, and the third lens has a convex surface on the image surface side, while the single-focus lens satisfies the following conditional expression (2):

$$2.0 < |R_{11} + R_{12}| / |R_{11} - R_{12}| < 8.0 \quad (2)$$

where $R_{11}$ is the radius of curvature of the object-side surface of the first lens; and $R_{12}$ is the radius of curvature of the image-surface-side surface of the first lens.

More preferably, the single-focus lens satisfies the following conditional expressions (3) to (6):

$$1.70 < N_{d1} \quad (3)$$

$$1.60 < N_{d3} \quad (4)$$

$$35 > \nu_{d1} \quad (5)$$

$$40 < \nu_{d3} \quad (6)$$

where $N_{d1}$ is the refractive index of the first lens at d-line;

$N_{d3}$ is the refractive index of the third lens at d-line;

$\nu_{d1}$ is the Abbe number of the first lens at d-line; and $\nu_{d3}$ is the Abbe number of the third lens at d-line.

The single-focus lens may be mounted in a collapsible camera, the first, second, and third lenses being integrally moved on the optical axis so as to shorten the distance between the third lens and an imaging device when the camera collapses.

At least one of lens surfaces of the first, second, and third lenses may be provided with a coating having a function of a low-pass filter and/or an infrared cut filter, so as to eliminate a glass block having a function of a low-pass filter and/or an infrared cut filter between the third lens and the imaging device.

BRIEF DESCRIPTION OF THE DRAWINGS

FIGS. 3A to 3C are aberration charts showing various kinds of aberration in the single-focus lens of Example 1; and FIGS. 4A to 4C are aberration charts showing various kinds of aberration in the single-focus lens of Example 2.

DESCRIPTION OF THE PREFERRED EMBODIMENTS

In the following, specific embodiments of the present invention will be explained with reference to the drawings.

Figure 1:
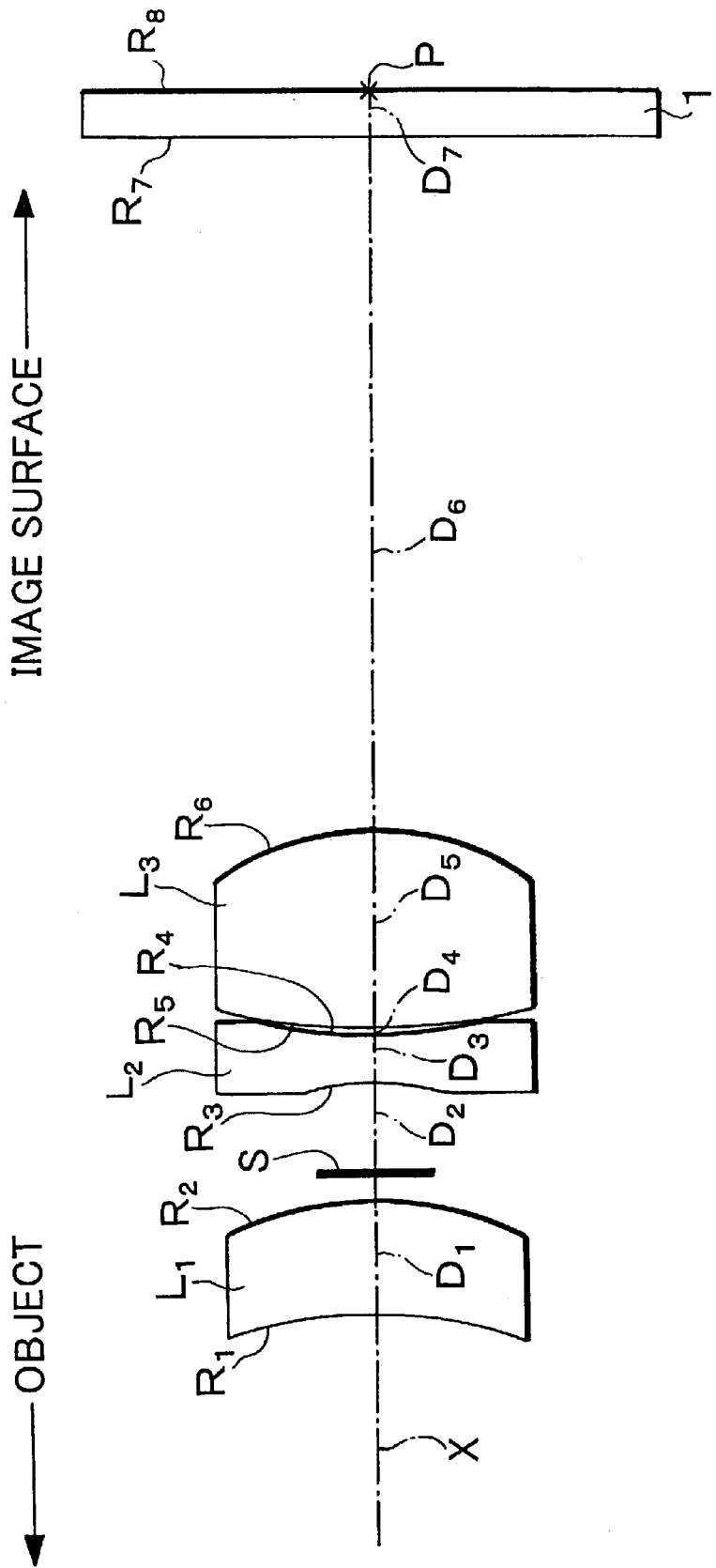
FIG. 1 is a schematic view showing the configuration of a single-focus lens in accordance with Example 1.

The single-focus lens in accordance with the embodiment shown in FIG. 1 (representing that of Example 1) comprises, successively from the object side, a first lens $L_1$ with a positive refracting power having at least one aspheric surface, a stop S, a second lens $L_2$ with a negative refracting power, and a third lens $L_3$ with a positive refracting power having at least one aspheric surface. The single-focus lens efficiently converges a luminous flux at an imaging position P on a cover glass sheet 1 of an imaging device. The single-focus lens is configured so as to satisfy the following conditional expression (1):

$$0.3 < f'/f'_{23} < 0.8 \quad (1)$$

where f' is the focal length of the lens as a whole; and $f'_{23}$ is the composite focal length of the second lens $L_2$ and third lens $L_3$.

The single-focus lens in accordance with this embodiment is configured with a power distribution of positive, negative, and positive from the object side, whereas the stop S is disposed between the first lens $L_1$ and second lens $L_2$, thus yielding a configuration suitable for attaining favorable optical performances as a single-focus lens with a three-lens configuration. Also, such a configuration makes it possible to provide a longer distance between the imaging position and the exit pupil. This reduces the angle formed between the principal ray of each luminous flux emitted from the final surface of the lens system and the optical axis X, thus yielding a favorable telecentricity and preventing color unevenness from occurring, whereby favorable optical performances can be obtained.

While attaining an inexpensive, simple lens configuration with only three lenses, the single-focus lens of this embodiment uses aspherical lenses and appropriately sets a power distribution, thereby making aberration sufficiently favorable and achieving high performances. Each of the aspheric surfaces is represented by the following aspheric surface expression:

$$Z=Ch^2/[1+(1-KC^2h^2)^{1/2}]+A_4h^4+A_6h^6+A_8h^8+A_{10}h^{10}$$

where

Z is the length of the perpendicular to a tangential plane (plane perpendicular to the optical axis) of an apex of the aspheric surface from a point on the aspheric surface having a height h from the optical axis;

C is the reciprocal of the paraxial radius of curvature R of the aspheric surface;

h is the height from the optical axis;

K is the eccentricity; and $A_4$, $A_6$, $A_8$, and $A_{10}$ are the fourth-, sixth-, eighth-, and tenth-order aspheric surface coefficients.

When an aspheric surface is formed on the image-surface-side surface of the first lens $L_1$, for example, its position is relatively closer to the stop S, whereby aspheric aberration becomes easier to improve. Forming both surfaces of the first lens $L_1$ aspheric is effective in correcting coma. Forming the image-surface-side surface of the third lens $L_3$ aspheric is effective in correcting distortion and curvature of field.

Further, since the stop S is disposed between the first lens $L_1$ and second lens $L_2$, this single-focus lens has a configuration in which the distance from the first lens $L_1$ to third lens $L_3$ including the stop S is made compact. Therefore, when constructed as a collapsible camera, the member closest to the object (first lens L1) to the cover glass sheet 1 can be accommodated compactly, whereby a thin camera is obtained. In this case, the single-focus lens can be configured, for example, such that the first lens $L_1$ to third lens $L_3$ move integrally on the optical axis X so as to reduce the distance $D_6$ between the third lens $L_3$ and the cover glass sheet 1.

Conventional taking lenses for CCD cameras are required to have a sufficiently long back focus since optical devices such as a low-pass filter and an infrared cut filter must be disposed in a space between the taking lens system and CCD. The back focus is sufficiently long in the single-focus lens of the present invention, so that these filters can be disposed between the third lens $L_3$ and the CCD cover glass sheet 1. However, the advance in coating techniques in recent years has made it possible to provide any of the lenses with coatings, thereby achieving functions of these filters. Coatings are advantageous in lowering the cost of lens system. Also, employing coatings can minimize the distance $D_6$ between the third lens $L_3$ and the cover glass sheet 1 at the time of accommodation in the collapsible type, thereby enabling more compact accommodation.

The above-mentioned conditional expression (1) is defined so as to achieve higher optical performances. In the single-focus lens of this embodiment, the first lens $L_1$ is disposed on the object side of the stop S, whereas the second lens $L_2$ and third lens $L_3$ are disposed on the image surface side thereof. In such a configuration, the composite focal length $f'_{23}$ between the second lens $L_2$ and third lens $L_3$ is required to satisfy a demand for attaining a long distance between the imaging position and the exit pupil, and a demand for establishing a power balance between the object side and image surface side of the stop S. If the lower limit of conditional expression (1) is not attained, the former demand will be hard to satisfy. If the upper limit is exceeded, by contrast, the latter demand will be hard to satisfy, so that it will be difficult to correct curvature of field.

In the single-focus lens of this embodiment, it is preferred that the second lens $L_2$ and third lens $L_3$ be disposed close to each other in order to attain favorable optical performances. Further, this makes the size of lens system compact in the optical axis direction, and can prevent the third lens $L_3$ from increasing its lens diameter.

Preferably, as shown in FIG. 1, the first lens $L_1$ has a meniscus form having a concave surface on the object side, the second lens $L_2$ has a concave surface on the object side, the third lens $L_3$ has a convex surface on the image surface side, and this single-focus lens satisfies the following conditional expressions (2) to (6):

$$2.0<|R_{11}+R_{12}|/|R_{11}-R_{12}|<8.0 \quad (2)$$

$$1.70<N_{d1} \quad (3)$$

$$1.60<N_{d3} \quad (4)$$

$$35>\nu_{d1} \quad (5)$$

$$40<\nu_{d3} \quad (6)$$

where $R_{11}$ is the radius of curvature of the object-side surface of the first lens $L_1$;

$R_{12}$ is the radius of curvature of the image-surface-side surface of the first lens $L_1$;

$N_{d1}$ is the refractive index of the first lens $L_1$ at d-line;

$Nd_{d3}$ is the refractive index of the third lens $L_3$ at d-line;

$\nu_{d1}$ is the Abbe number of the first lens $L_1$ at d-line; and $\nu_{d3}$ is the Abbe number of the third lens $L_3$ at d-line.

Setting the surface forms of the first lens $L_1$ to third lens $L_3$ as mentioned above and conditional expressions (2) to (6) makes aberration favorable, thereby contributing to an improvement in performances.

Conditional expression (2) defines a shape factor of the first lens $L_1$. Preferably, the first lens $L_1$ having a positive refracting power has a meniscus form with a concave surface on the object side, and a surface form falling within the range of conditional expression (2). If the lower limit is not attained, the power of the first lens $L_1$ will be so strong that a power balance will be hard to establish between the object side and image surface side of the stop S, whereby coma and curvature of field will be hard to correct. If the upper limit is exceeded, by contrast, the power of the first lens $L_1$ will be so weak that it will be necessary to increase the refractive index of a glass material in order for the first lens $L_1$ to have a power required for attaining a power balance between the object side and image surface side of the stop S. However, the refractive index of the glass material has an upper limit, so that a predetermined power defined by the surface form is necessary for the first lens $L_1$ to attain a required power, whereby the upper limit of conditional expression (2) is set. Namely, when the form of the first lens $L_1$ satisfies conditional expression (2), the power balance of the lens between the object side and image surface side of the stop S can be made favorable.

Conditional expressions (3) to (6) define characteristics of glass materials of the first lens $L_1$ and third lens $L_3$. Outside these numeric ranges, chromatic aberration is hard to correct. From the viewpoint of aberration, the first lens $L_1$ is desired to exhibit a small curvature in its surface form while having a positive power. For satisfying these characteristics, the refractive index $N_{d1}$ of the glass material is desired to be higher, whereby the lower limit of conditional expression (3) is set. For the refractive index $N_{d3}$ of the third lens $L_3$, the surface curvature is not desired to be too large from the viewpoint of manufacture, while the lens is provided with a required power, whereby the lower limit of conditional expression (4) is set. Conditional expressions (5) and (6) define respective Abbe numbers $v_{d1}$ and $v_{d3}$ of the first lens $L_1$ and third lens $L_3$ each having a positive refracting power, whereby chromatic aberration can be corrected favorably.

The single-focus lens in accordance with the present invention can be modified in various manners. For example, the form of each lens and the form of each aspheric surface can be selected appropriately. Also, while the single-focus lens of the present invention has high performances suitable for a taking lens for a digital camera, it can be mounted in various instruments without being restricted to the digital camera.

EXAMPLE

In the following, Examples will be explained with reference to specific numeric values.

Example 1

FIG. 1 shows the configuration of the single-focus lens in accordance with Example 1. This single-focus lens is configured as explained in the above-mentioned embodiment. Specifically, the single-focus lens comprises, successively from the object side, a first lens $L_1$ made of a meniscus lens with a positive refracting power having aspheric surfaces on both sides with a convex surface directed onto the image surface side, a stop S, a second lens $L_2$ made of a biconcave lens having a surface with a greater curvature directed onto the object side, and a third lens $L_3$ made of a biconvex lens having an aspheric surface on the image surface side with a surface having a greater curvature directed onto the image surface side.

The upper part of the following Table 1 shows the focal length f', Fno., and angle of view 2ω of this single-focus lens. The middle part of Table 1 shows the radius of curvature R of each lens surface, the center thickness of each lens and the air space between each pair of neighboring lenses (hereinafter collectively referred to as axial surface space) D, and the refractive index N and Abbe number ν of each lens at d-line. The radius of curvature R and axial surface space D are standardized with respect to the focal length 1.00 (mm) of the whole lens system. Here, the surface number successively increases from the object side, whereas the surfaces indicated by "*" on the left side of their surface numbers refer to aspheric surfaces. The lower part of Table 1 shows the values of constants K, $A_4$, $A_6$, $A_8$, and $A_{10}$ of each aspheric surface shown in the above-mentioned aspheric surface expression. Also, as will be explained later, this Example satisfies the above-mentioned conditional expressions (1) to (6).

Example 2

Figure 2:
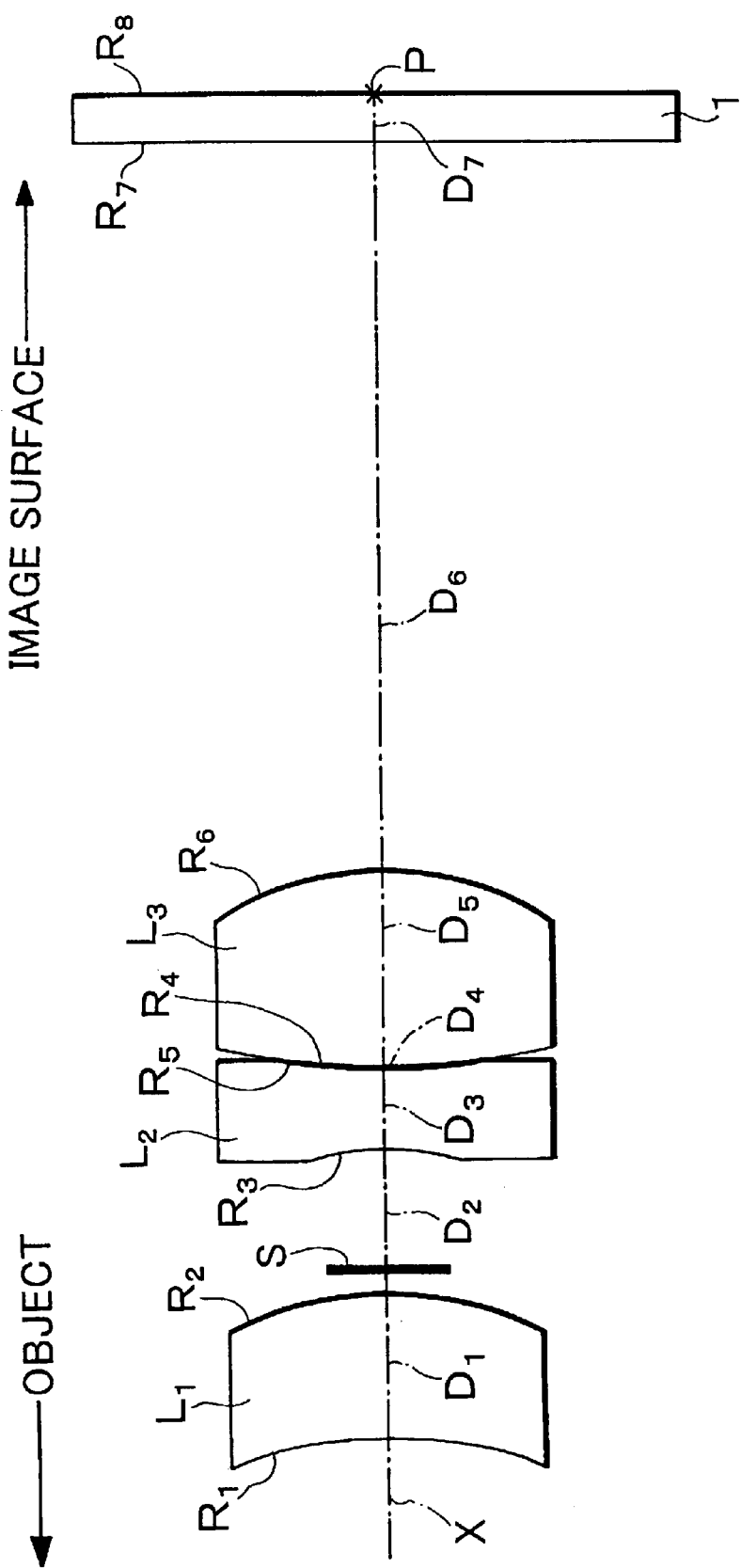
FIG. 2 is a schematic view showing the configuration of a single-focus lens in accordance with Example 2.

FIG. 2 shows the configuration of the single-focus lens in accordance with Example 2. This single-focus lens has a configuration substantially the same as that of Example 1. The upper part of the following Table 2 shows the focal length f', Fno., and angle of view 2ω of this single-focus lens. The middle part of Table 2 shows the radius of curvature R of each lens surface, the axial surface space D of each lens, and the refractive index N and Abbe number ν of each lens at d-line. The radius of curvature R and axial surface space D are standardized with respect to the focal length 1.00 (mm) of the whole lens system. Here, the surface number successively increases from the object side, whereas the surfaces indicated by "*" on the left side of their surface numbers refer to aspheric surfaces. The lower part of Table 2 shows the values of constants K, $A_4$, $A_6$, $A_8$, and $A_{10}$ of each aspheric surface shown in the above-mentioned aspheric surface expression. Also, as will be explained later, this Example satisfies the above-mentioned conditional expressions (1) to (6).

FIGS. 3A to 3C and 4A to 4C are aberration charts showing various kinds of aberration (spherical aberration, astigmatism, and distortion) of the single-focus lenses in accordance with the above-mentioned Examples. Each astigmatism chart shows respective aberrations with respect to sagittal (S) and tangential (T) image surfaces. As can be seen from these aberration charts, the single-focus lenses of the above-mentioned Examples can favorably correct various kinds of aberration.

Table 3 shows the values corresponding the above-mentioned conditional expressions (1) to (6) of the single-focus lenses in accordance with the above-mentioned Examples. These examples satisfy all of the above-mentioned conditional expressions (1) to (6).

As explained in the foregoing, the single-focus lens of the present invention is configured with a power distribution of positive, negative, and positive successively from the object side, a stop S is disposed between the first and second lenses, aspherical lenses are used, and the composite focal length on the image surface side of the stop is set appropriately. This can yield a single-focus lens which can achieve high performances while compactly arranging the first to third lenses including a stop-in an inexpensive, simple lens configuration with such a small number of lenses as three lenses.

TABLE 1

| f' = 1.00 | Fno. = 5.6 | 2 ω = 49.4 | |
|---|---|---|---|
| Surface number | R | D | $N_d$ | $v_d$ |
| *1 | −0.9178 | 0.18816 | 1.90680 | 21.2 |
| *2 | −0.5020 | 0.18946 | | |

TABLE 1-continued

| | | | | |
|---|---|---|---|---|
| 3 | −0.4312 | 0.08624 | 1.84666 | 23.8 |
| 4 | 0.8332 | 0.00928 | | |
| 5 | 1.4917 | 0.32928 | 1.75512 | 45.6 |
| *6 | −0.4000 | 1.14785 | | |
| 7 | ∞ | 0.07840 | 1.51680 | 64.2 |
| 8 | ∞ | | | |

| Aspheric surface coefficient | K | $A_4$ | $A_6$ | $A_8$ | $A_{10}$ |
|---|---|---|---|---|---|
| 1st surface | 1.6365 | −1.5092 | −1.0942 × 10 | 1.8624 × $10^2$ | −1.4756 × $10^3$ |
| 2nd surface | −8.0362 | −7.7547 | 7.2177 × 10 | −2.5481 × $10^2$ | 9.1476 × $10^2$ |
| 6th surface | −1.8329 | −5.1685 | 9.8121 | −3.1364 × 10 | −8.6743 × $10^2$ |

What is claimed is:

1. A single-focus lens comprising, successively from the object side, a first lens with a positive refracting power having at least one aspheric surface, a stop, a second lens with a negative refracting power, and a third lens with a positive refracting power having at least one aspheric surface; and satisfying the following conditional expression (1):

$$0.3 < f/f_{23} < 0.8 \tag{1}$$

where f is the focal length of the lens as a whole; and $f_{23}$ is the composite focal length of the second and third lenses.

2. A single-focus lens according to claim 1, wherein said first lens has a meniscus form with a concave surface on the object side, said second lens has a concave surface on the object side, and said third lens has a convex surface on the image surface side; said single-focus lens satisfying the following conditional expression (2):

$$2.0 < |R_{11}+R_{12}|/|R_{11}-R_{12}| < 8.0 \tag{2}$$

where $R_{11}$ is the radius of curvature of the object-side surface of the first lens; and $R_{12}$ is the radius of curvature of the image-surface-side surface of the first lens.

3. A single-focus lens according to claim 1, wherein said single-focus lens satisfies the following conditional expressions (3) to (6):

$$1.70 < N_{d1} \tag{3}$$

$$1.60 < N_{d3} \tag{4}$$

$$35 > \nu_{d1} \tag{5}$$

$$40 < \nu_{d3} \tag{6}$$

where $N_{d1}$ is the refractive index of the first lens at d-line;

$N_{d3}$ is the refractive index of the third lens at d-line;

$\nu_{d1}$ is the Abbe number of the first lens at d-line; and $\nu_{d3}$ is the Abbe number of the third lens at d-line.

4. A single-focus lens according to claim 1, wherein said single-focus lens is mounted in a collapsible camera, said first, second, and third lenses being integrally moved on an optical axis so as to shorten a distance between said third lens and an imaging device when said camera collapses.

5. A single-focus lens according to claim 1, wherein at least one of lens surfaces of said first, second, and third lenses is provided with a coating having a function of a low-pass filter and/or an infrared cut filter.

* * * * *

UNITED STATES PATENT AND TRADEMARK OFFICE
CERTIFICATE OF CORRECTION

PATENT NO. : 6,724,547 B2
DATED : April 20, 2004
INVENTOR(S) : Kenichi Sato

It is certified that error appears in the above-identified patent and that said Letters Patent is hereby corrected as shown below:

Title page,
Item [57], ABSTRACT,
Line 6, delete "$0.3<f/f2´3<0.8$" and substitute therefore -- $0.3<f´/f´_{23}<0.8$ --

Column 7,
Line 24, delete "$0.3<f´/f´_{23}<0.8$" and substitute therefore -- $0.3<f´/f´_{23}<0.8$ --

Signed and Sealed this

Twenty-third Day of November, 2004

JON W. DUDAS
*Director of the United States Patent and Trademark Office*